United States Patent
Hu et al.

(10) Patent No.: US 8,739,097 B2
(45) Date of Patent: May 27, 2014

(54) METHOD FOR PLACING DECOUPLING CAPACITORS

(75) Inventors: Chi-Wei Hu, Pingzhen (TW); Kuan-Yu Lin, Zhudong Township (TW); Wan-Chun Chen, Taichung (TW); Chin-Chou Liu, Jhubei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 13/618,519

(22) Filed: Sep. 14, 2012

(65) Prior Publication Data

US 2014/0082575 A1    Mar. 20, 2014

(51) Int. Cl.
*G06F 17/50* (2006.01)

(52) U.S. Cl.
USPC ............ 716/112; 716/110; 716/119; 716/132

(58) Field of Classification Search
USPC ................................. 716/110, 112, 119, 132
See application file for complete search history.

(56) References Cited

U.S. PATENT DOCUMENTS

| | | | | |
|---|---|---|---|---|
| 4,744,008 | A * | 5/1988 | Black et al. | 361/717 |
| 5,883,423 | A * | 3/1999 | Patwa et al. | 257/532 |
| 6,456,737 | B1 * | 9/2002 | Woodfill et al. | 382/154 |
| 6,487,702 | B2 * | 11/2002 | Lin et al. | 716/119 |
| 6,640,331 | B2 * | 10/2003 | Bobba et al. | 716/130 |
| 6,842,714 | B1 * | 1/2005 | Acar et al. | 702/136 |
| 6,898,769 | B2 * | 5/2005 | Nassif et al. | 716/115 |
| 6,900,991 | B2 * | 5/2005 | Patel et al. | 361/782 |
| 7,002,256 | B1 * | 2/2006 | Nakamura | 257/781 |
| 7,133,294 | B2 * | 11/2006 | Patel et al. | 361/782 |
| 7,492,570 | B2 * | 2/2009 | Hosomi et al. | 361/306.2 |
| 7,571,404 | B2 * | 8/2009 | Zhao et al. | 716/106 |
| 7,698,677 | B2 * | 4/2010 | Zhao et al. | 716/122 |

OTHER PUBLICATIONS

Li, Hang, et al., "Partitioning-Based Approach to Fast On-Chip Decoupling Capacitor Budgeting and Minimization" IEEE Transactions on Computer-Aided Design of Integrated Circuits and Systems (Nov. 2006), vol. 25, No. 11, pp. 2402-2412.

* cited by examiner

*Primary Examiner* — Sun Lin

(74) *Attorney, Agent, or Firm* — Slater and Matsil, L.L.P.

(57) ABSTRACT

A method comprises selecting a region from a layout pattern of an integrated circuit, wherein the region comprises a plurality of functional units, and wherein the functional units are not coupled to each other through a variety of connection components, identifying hot spots in the region using a first threshold and inserting a plurality of decoupling capacitors adjacent to the hot spots.

20 Claims, 3 Drawing Sheets

US 8,739,097 B2

METHOD FOR PLACING DECOUPLING CAPACITORS

BACKGROUND

The semiconductor industry has experienced rapid growth due to continuous improvements in the integration density of a variety of electronic components (e.g., transistors, diodes, resistors, capacitors, etc.). For the most part, this improvement in integration density has come from repeated reductions in minimum feature size, which allows more components to be integrated into a given area. As the demand for even smaller electronic devices has grown recently, there has grown a need for improving power integrity of integrated circuits.

As semiconductor technologies evolve, the speed of integrated circuits has increased exponentially as semiconductor process nodes shrink to a few nanometers. Such increased operating speed demands a stable power bus so that logic circuits coupled to the power bus can operate reliably. However, as the scale of the integrated circuit shrinks to a lower level, the resistance of the power distribution network of an integrated circuit may increase as a result. Such increased distribution network resistance prevents the power bus from rapidly adapting to load variations of the integrated circuit. As a result, the voltage of the power bus may deviate from the specified range of the integrated circuit. The voltage deviation on the power bus may cause a variety of reliability issues such as reducing noise margins, increasing signal delays and/or the like.

Inserting decoupling capacitors next to local power buses of an integrated circuit is an effective method to maintain the voltages of local power buses within the specified range of the integrated circuit. During a logic transition, the load of the integrated circuit may change rapidly. The decoupling capacitors placed locally may function as a local power source like a reservoir of current, which is instantaneously available for the adjacent switching load. As a result, the glitches of the voltage of the local power bus can be prevented through a discharge of the energy stored in the decoupling capacitors.

Ideally, a plurality of decoupling capacitors may be placed next to each power bus of an integrated circuit. However, the placement locations of decoupling capacitors are limited by the space available for inserting decoupling capacitors. In addition, decoupling capacitors are commonly formed by CMOS transistors, which may cause unnecessary power leakage if redundant decoupling capacitors are employed.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to embodiments in a specific context, namely a decoupling capacitor insertion method for a logic gate based integrated circuit. The embodiments of the disclosure may also be applied, however, to a variety of semiconductor devices. Hereinafter, various embodiments will be explained in detail with reference to the accompanying drawings.

Figure 1:
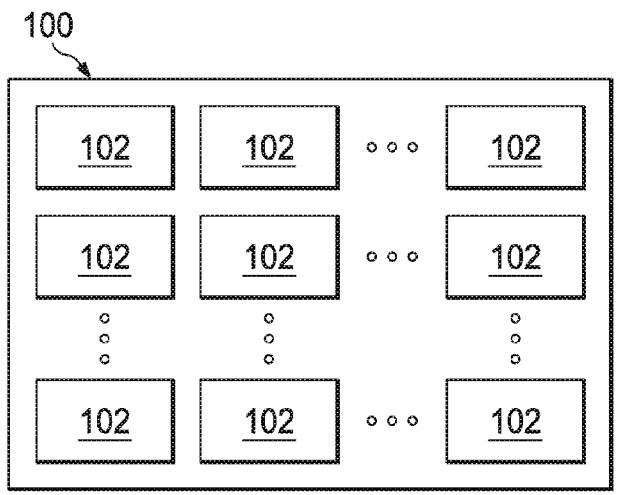
FIG. 1 illustrates a layout pattern of an integrated circuit in accordance with an embodiment.

FIG. 1 illustrates a layout pattern of an integrated circuit in accordance with an embodiment. The integrated circuit 100 is formed in and on a substrate (not shown). The substrate may be formed of silicon, although it may also be formed of other group III, group IV, and/or group V elements, such as silicon, germanium, gallium, arsenic, and combinations thereof. The substrate may also be in the form of silicon-on-insulator (SOI). The SOI substrate may comprise a layer of a semiconductor material (e.g., silicon, germanium and/or the like) formed over an insulator layer (e.g., buried oxide or the like), which is formed in a silicon substrate. In addition, other substrates that may be used include multi-layered substrates, gradient substrates, hybrid orientation substrates and/or the like.

The integrated circuit 100 may comprise a variety of electrical circuits. The electrical circuits formed in and on the substrate may be any type of circuitry suitable for a particular application. In accordance with an embodiment, the electrical circuits may include various n-type metal-oxide semiconductor (NMOS) and/or p-type metal-oxide semiconductor (PMOS) devices such as transistors, capacitors, resistors, diodes, photo-diodes, fuses and/or the like. The electrical circuits may be interconnected to perform one or more functions. The functions may include memory structures, processing structures, sensors, amplifiers, power distribution, input/output circuitry and/or the like The electrical circuits of the integrated circuit 100 may be divided into a plurality of functional units. For example, a logic gate such as an AND gate may be selected as a single functional unit. On the other hand, a variety of logic circuits may be grouped together to form a single functional unit. The definition of functional units may depend on some key circuit operating parameters such as drive strength, power consumption and/or the like. Moreover, the definition of function units may be subject to change depending on the needs of different design requirements.

As shown in FIG. 1, the integrated circuit 100 includes a plurality of functional units 102. In accordance with an embodiment, each functional unit 102 may be a logic gate, a buffer, an inverter, a flip-flop circuit and/or the like. It should be noted that the functional unit 102 illustrated in FIG. 1 is merely an example, which should not unduly limit the scope of the claims. One of ordinary skill in the art would recognize many variations, alternatives, and modifications. For example, other alternatives could be employed (such as grouping a different number of gates in one functional unit) and that other circuits, (e.g., a voltage controlled oscillator, a delay locked loop, etc.) could be alternatively employed.

Figure 2A:
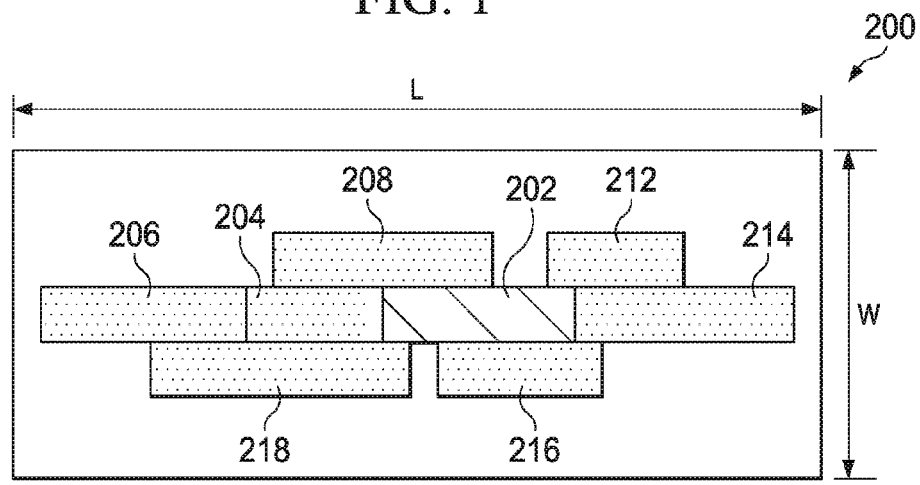
FIG. 2A illustrates a plurality of functional units including at least one high drive cell in accordance with an embodiment.
Figure 2B:
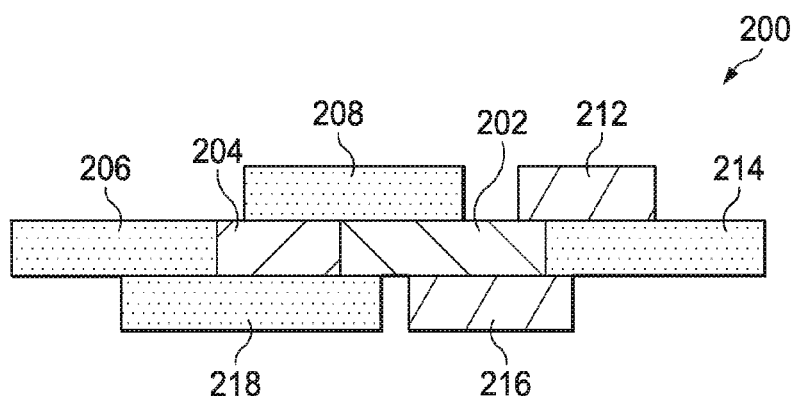
FIG. 2B illustrates a process of detecting hot spots in accordance with an embodiment.

FIG. 2A and FIG. 2B illustrate a first method of inserting decoupling capacitors next to functional units shown in FIG. 1. FIG. 2A illustrates a plurality of functional units including at least one high drive cell in accordance with an embodiment. Referring back to FIG. 1, there may be a plurality of functional units in the integrated circuit 100. A high drive cell is defined as a functional unit having a high driving capability, a high power consumption level and/or the like. In accordance with an embodiment, the power consumption level of a high drive cell may be approximately eight times greater than the power consumption level of a logic gate. It should be noted that the definition of the high drive cell described above is merely an example. In response to different design needs, the definition of a high drive cell may change accordingly.

As shown in FIG. 2A, the functional unit 202 is selected because the power consumption level of the functional unit 202 is greater than the threshold of a high drive cell. In order to detect hot spots and insert decoupling capacitors next to the hot spots, a neighborhood (indicated by the dashed rectangle) of the functional unit 202 is defined as shown in FIG. 2A. In accordance with an embodiment, the neighborhood is of a length L approximately equal to 10 um and a width W approximately equal to 2 um.

The neighborhood may include a plurality of functional units coupled to the functional unit 202. As shown in FIG. 2A, there may be seven functional units coupled to the functional unit 202. These seven functional units 204, 206, 208, 212, 214, 216 and 218 are physically adjacent to the functional unit 202 and located within the neighborhood. In addition, these seven functional units may be electrically coupled to the functional unit 202. For example, all functional units shown in FIG. 2A may share at least one power bus.

FIG. 2B illustrates a process of detecting hot spots in accordance with an embodiment. The hot spots can be detected by comparing a functional unit's power consumption with a second threshold. In accordance with an embodiment, the second threshold may be equal to the threshold for the high drive cell described above. In other words, a functional unit coupled to the functional unit 202 is a hot spot if the power consumption of this functional unit is approximately eight times greater than a logic gate. On the other hand, the second threshold may be a different value depending on the needs of different design requirements.

As shown in FIG. 2B, after comparing each functional unit's power consumption with the second threshold, functional units 206, 208, 214 and 218 are labeled as hot spots. Furthermore, decoupling capacitors are inserted adjacent to each hot spot. There may be three scenarios when decoupling capacitors are inserted next to the hot spots. First, the space adjacent to one hot spot is sufficient for accommodating a single decoupling capacitor. A single decoupling capacitor will be inserted next to the hot spot.

Second, the available space adjacent to one hot spot is sufficient for accommodating a plurality of decoupling capacitors. Either a single decoupling capacitor or a plurality of decoupling capacitors will be inserted adjacent to the hot spot depending on the design needs. Third, the available space adjacent to one hot spot is insufficient for accommodating a single decoupling capacitor. A single decoupling capacitor is inserted adjacent to the hot spot through a process of adjusting the layout pattern of the functional units. According to an embodiment, the layout can be adjusted through relocating functional units.

The process of detecting hot spots and inserting decoupling capacitors shown in FIG. 2A and FIG. 2B may be applied to all function units shown in FIG. 1. As a result, all hot spots may be identified. By inserting decoupling capacitors adjacent to the detected hot spots, the decoupling capacitors may function as a reservoir of current, which can provide instantaneous currents during sinking or sourcing of load transitions. As a result, the functional units at the hot spots may operate reliably during the load transitions.

In accordance with an embodiment, based upon conventional techniques, a system on chip (SoC) integrated circuit (not shown) may require approximately 30,000 decoupling capacitors to maintain the local power buses within a specified voltage range. In contrast, based upon the mechanism shown in FIG. 2A and FIG. 2B, the SoC integrated circuit may only require approximately 5,333 decoupling capacitors to achieve a stable power bus during switching transitions. One advantageous feature of having a reduced number of decoupling capacitors is that the layout space for the decoupling capacitors as well as the leakage from the decoupling capacitors may be reduced accordingly.

Figure 3:
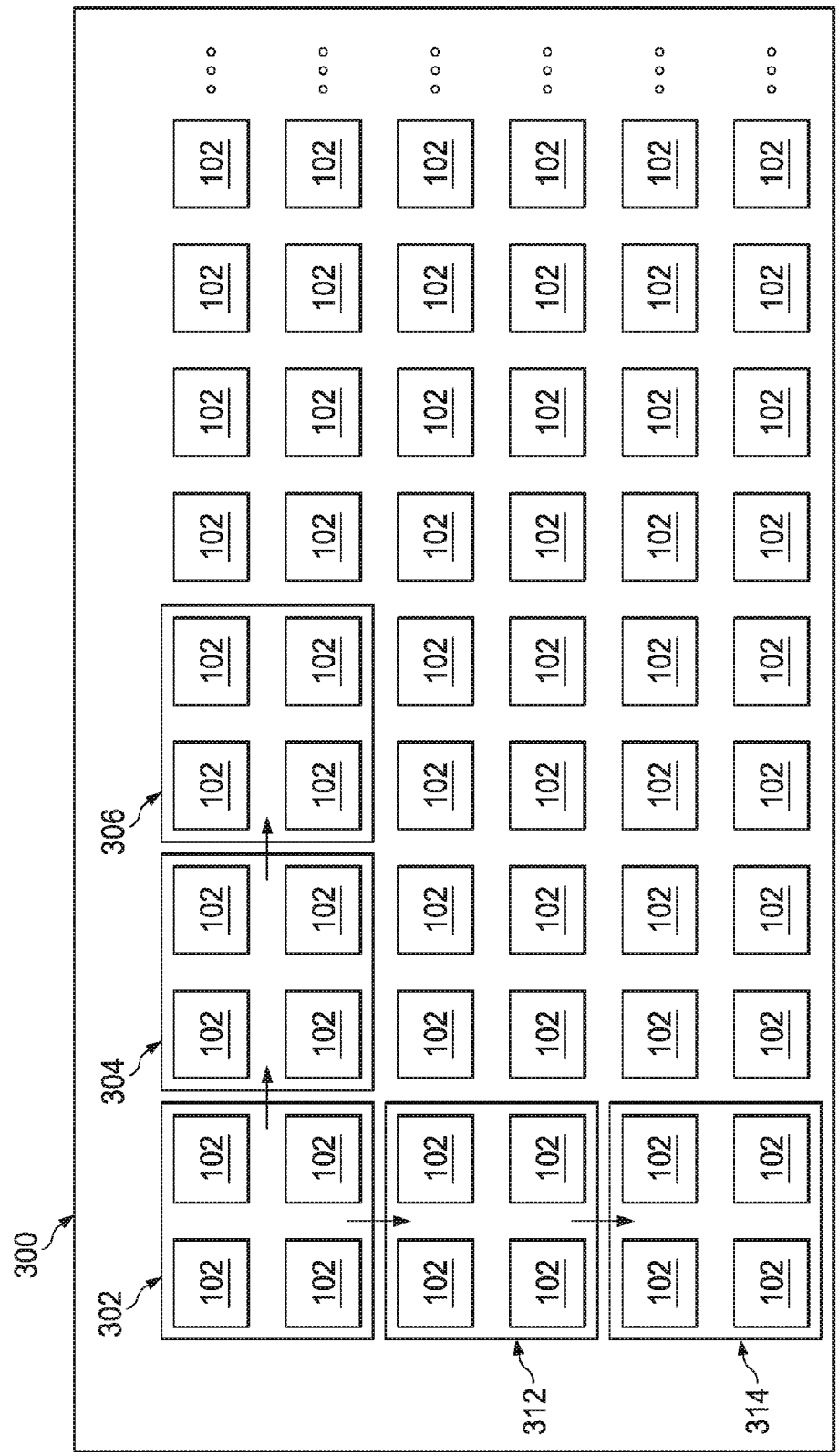
FIG. 3 illustrates another embodiment method for detecting hot spots involving a sliding window scan in accordance with an embodiment.

FIG. 3 illustrates another embodiment method for detecting hot spots involving a sliding window scan in accordance with an embodiment. The integrated circuit 300 may comprise a plurality of functional units arranged in rows and columns. A sliding window 302 is employed to define a region being analyzed during a hot spot identification step. In accordance with an embodiment, the sliding window 302 may have a length approximately equal to 5 um and a width approximately equal to 5 um. It should be noted that the dimensions used herein are selected purely for demonstration purposes and are not intended to limit the various embodiments to any particular size dimensions.

As shown in FIG. 3, four functional units fall into the sliding window 302. It should be noted while FIG. 3 illustrates the sliding window 302 may comprise four functional units, the sliding window 302 may accommodate any number of functional units through selecting different window dimensions.

The scanning process may start from a corner of the integrated circuit 300. Then, the number of high drive cells in the sliding window may be counted. If the total number of high drive cells is greater than a third threshold, the high drive cells in this sliding window are labeled as hot spots. As a result, decoupling capacitors are inserted adjacent to each high drive cell in this sliding window. On the other hand, when the total number of high drive cells is less than the third threshold, no decoupling capacitors are inserted and the sliding window moves rightwards by one position (e.g., from sliding window 302 to sliding window 304).

In accordance with an embodiment, the value of the third threshold is approximately equal to ten. It should be noted that the third threshold may be subject to change depending on different design requirements.

As shown in FIG. 3, the sliding window may move rightwards by one position until the sliding window reaches the right edge of the integrated circuit 300. The sliding window may then start from the upper left corner of the undetected region (e.g., the location of the sliding window 312). Alternatively, the sliding window may move downwards by one position (e.g., from sliding window 302 to sliding window 312) until the sliding window reaches the bottom of the integrated circuit 300. Then, the sliding window may start from the upper left corner of the undetected region (e.g., the location of the sliding window 304).

In accordance with an embodiment, based upon conventional techniques, a system on chip (SoC) integrated circuit (not shown) may require approximately 30,000 decoupling capacitors to maintain local power buses stable during various load transitions. In contrast, based upon the mechanism shown in FIG. 3, the SoC integrated circuit may only require approximately 3,584 decoupling capacitors to achieve a stable power bus during the same load transitions. By employing the method described in FIG. 3, the total number of decoupling capacitors may be reduced by 81%.

One advantageous feature of having a reduced number of decoupling capacitors is that the layout space for the decoupling capacitors as well as the leakage from the decoupling capacitors may be reduced accordingly.

Figure 4:
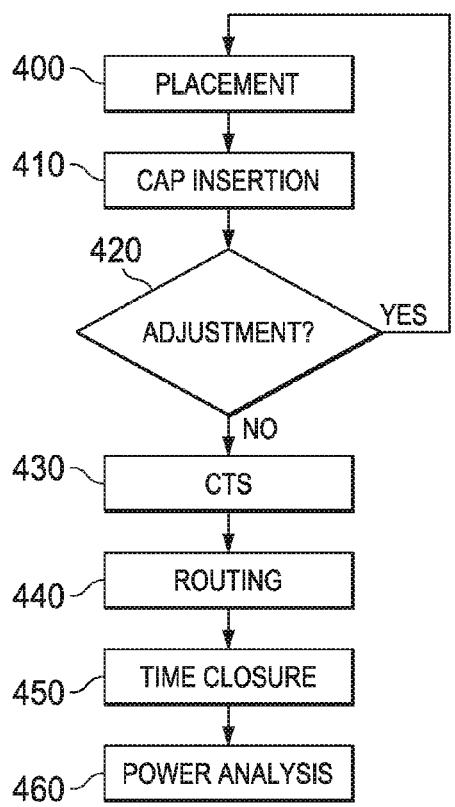
FIG. 4 illustrates a flow chart in accordance with a decoupling capacitor insertion scheme.

FIG. 4 illustrates a flow chart in accordance with a decoupling capacitor insertion scheme. At step 400, a variety of functional units are placed in consideration with electrical and thermal requirements of an integrated circuit. It should be noted that the routing process is not applied to the variety of functional units, and thus the functional units are not connected to each other yet at step 400.

At step 410, decoupling capacitors are inserted at hot spots according to either the method shown in FIG. 2B or the method shown in FIG. 3. The detailed procedures of inserting decoupling capacitors have been described above with respect to FIG. 2B and FIG. 3, and hence are not discussed herein to avoid repetition.

At step 420, if there is a need of adjusting the layout pattern of the functional units so that the decoupling capacitors can be inserted adjacent to their corresponding functional unit, then the algorithm executes step 400 wherein the placement of the functional units are adjusted in consideration with the insertion of decoupling capacitors.

On the other hand, if the space adjacent to hot spots is sufficient for the decoupling capacitors and it is not necessary to adjust the placement of the functional units, the algorithm executes step 430 wherein a clock tree synthesis (CTS) process is applied to the layout pattern of the integrated circuit.

At step 440, the functional units are connected to each other through a routing process. At step 450, in order to meet the timing requirements of the integrated circuit, a timing closure process is applied to the layout pattern. At step 460, in order to have enough power consumption margins as well as noise margins, a power analysis process is applied to the layout pattern.

It should be noted that while FIG. 4 illustrate a control algorithm for inserting decoupling capacitors, a person having ordinary skill in the art will recognize many alternatives. For example, various step as illustrated in FIG. 4 may added, removed, replaced, rearranged, repeated, overlapped, and/or partially overlapped.

FIG. 4 shows that the decoupling capacitor insertion step is performed prior to the routing step. One advantageous feature of having the decoupling capacitor insertion step prior to the routing process is that the time of routing functional units can be reduced. In comparison with conventional decoupling capacitor insertion techniques, the insertion procedures described above include a decoupling capacitor insertion step as well as a component relocation step prior to a routing step. In other words, the routing step will not be performed until the decoupling capacitors have been allocated in the layout pattern.

By employing this sequence shown in the flow chart of FIG. 4, it is not necessary to repeat the routing process because the component placement as well as the decoupling capacitor insertion has been fixed and there is no need to adjust the routing. As such, the iteration times for repeating the routing step may be reduced, and thus the manufacturing cost of the integrated circuit is reduced.

Figure 5:
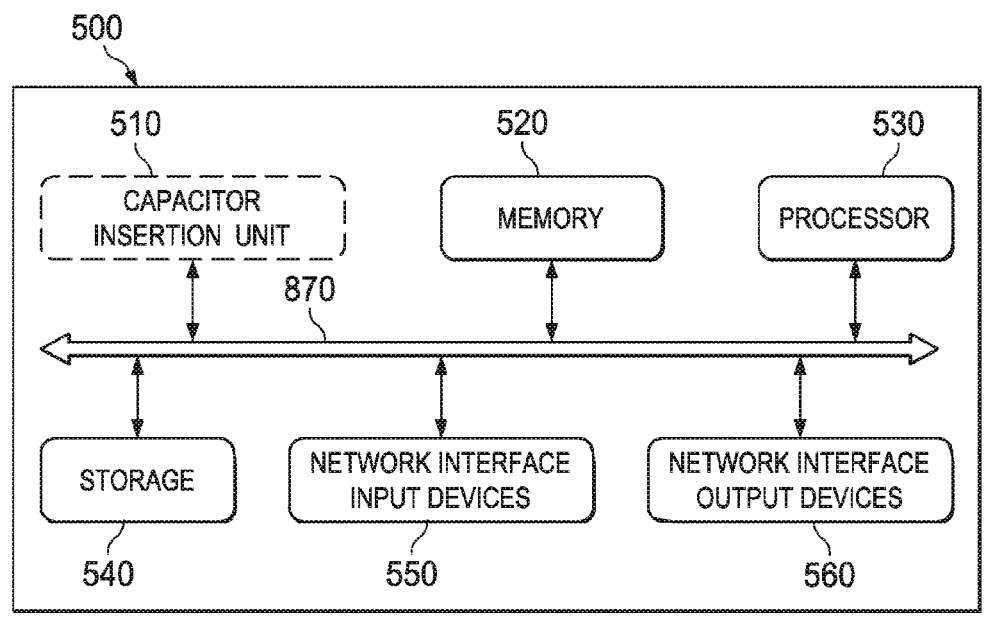
FIG. 5 illustrates a simplified block diagram of a computer system that can be used to implement the decoupling capacitor insertion method in accordance with an embodiment.

FIG. 5 illustrates a simplified block diagram of a computer system 500 that can be used to implement the decoupling capacitor insertion method in accordance with an embodiment. The computer system 500 includes a decoupling capacitor insertion unit 510, a memory 520, a processor 530, a storage unit 540, network interface input devices 550, network interface output devices 560 and a data bus 570. It should be noted that this diagram is merely an example of a personal computer, which should not unduly limit the scope of the claims. Many other configurations of a personal computer are within the scope of this disclosure. One of ordinary skill in the art would also recognize the advanced media preview method may be performed by other computer systems including a portable computer, a workstation, a network computer, or the like.

The decoupling capacitor insertion unit 510 may be a physical device, a software program, or a combination of software and hardware such as an Application Specific Integrated Circuit (ASIC). In accordance with an embodiment, when the computer receives a layout pattern through the network interface input devices 550, the processor 530 loads the layout pattern into the storage unit 540. According to an embodiment where the decoupling capacitor insertion method is implemented as a software program, the processor 530 loads the software program from the storage unit 540 and operates it in the memory 520. After the processor 530 performs the steps of FIG. 3, the processor 530 sends the results to the end user through a network interface output devices 560.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:

selecting, by a processor, a region from a layout pattern of an integrated circuit, wherein the region comprises a plurality of functional units, and wherein the functional units are not coupled to each other through a variety of connection components;

selecting a high drive cell using a first threshold;

identifying hot spots in the region using a second threshold, wherein the high drive cell is surrounded by the hot spots; and inserting a plurality of decoupling capacitors adjacent to the hot spots.

2. The method of claim 1, further comprising:
defining a neighborhood including a plurality of functional units placed adjacent to the high drive cell; and
comparing each of the plurality of functional units with a benchmark functional unit to identify the hot spots.

3. The method of claim 2, wherein:
the neighborhood is of a length approximately equal to 10 um and a width approximately equal to 2 um.

4. The method of claim 2, wherein:
the high drive cell is of a power consumption level, which is eight times greater than a power consumption level of a logic gate.

5. The method of claim 2, wherein:
the benchmark functional unit is a logic gate.

6. The method of claim 1, further comprising:
defining a neighborhood through a sliding window, wherein the neighborhood comprises a plurality of functional units;
comparing each of the plurality of functional units in the neighborhood with a benchmark functional unit to identify high drive cells; and
inserting decoupling capacitors adjacent to each high drive cell if a total number of high drive cells in the neighborhood is greater than a threshold.

7. The method of claim 6, wherein:
the sliding window has a length approximately equal to 5 um; and
the sliding window has a width approximately equal to 5 um.

8. The method of claim 6, wherein:
the threshold is approximately equal to 10.

9. The method of claim 6, wherein:
the benchmark functional unit is a logic gate.

10. A method comprising:
placing a plurality of functional units in a layout pattern of an integrated circuit;
applying, by a processor, a decoupling capacitor insertion scheme to the layout pattern, wherein the decoupling capacitor insertion scheme includes:
  selecting a region from the layout pattern of the integrated circuit, wherein the region comprises a plurality of functional units, and wherein the functional units are not coupled to each other through a variety of connection components;
  selecting a high drive cell using a first threshold;
  identifying hot spots in the region using a second threshold, wherein the high drive cell is surrounded by the hot spots; and
  inserting a plurality of decoupling capacitors adjacent to the hot spots; and
applying a routing process to the layout pattern.

11. The method of claim 10, further comprising:
after the step of applying a decoupling capacitor insertion scheme to the layout pattern, determining whether the layout pattern provides a sufficient space for the decoupling capacitors; and
adjusting the layout pattern so as to accommodate the decoupling capacitors based upon a result of the step of determining whether the layout pattern provides a sufficient space for the decoupling capacitors.

12. The method of claim 11, wherein:
the step of adjusting the layout pattern so as to accommodate the decoupling capacitors is performed prior to the step of applying a routing process to the layout pattern.

13. The method of claim 11, further comprising:
after the step of adjusting the layout pattern so as to accommodate the decoupling capacitors, applying a circuit timing synthesis process to the layout pattern;
applying a timing closure process to the layout pattern; and
applying a power analysis process to the layout pattern.

14. The method of claim 10, wherein:
the functional units are selected from the group consisting of logic gates, inverters, buffers and flip-flop circuits.

15. The method of claim 10, wherein:
the functional units are formed in and on a substrate.

16. A computer program product having a non-transitory computer-readable medium with a computer program embodied thereon, the computer program comprising:
computer program code for selecting, by a processor, a region from a layout pattern of an integrated circuit, wherein the region comprises a plurality of functional units, and wherein the functional units are not coupled to each other through a variety of connection components;
computer program code for selecting a high drive cell using a first threshold;
computer program code for identifying hot spots in the region using a second threshold, wherein the high drive cell is surrounded by the hot spots; and
computer program code for inserting a plurality of decoupling capacitors adjacent to the hot spots.

17. The computer program product of claim 16, further comprising:
computer program code for selecting a high drive cell from the layout pattern of the integrated circuit;
computer program code for defining a neighborhood including a plurality of functional units placed adjacent to the high drive cell; and
computer program code for comparing each of the plurality of functional units with a benchmark functional unit to identify the hot spots.

18. The computer program product of claim 16, further comprising:
computer program code for defining a neighborhood through a sliding window, wherein the neighborhood comprises a plurality of functional units;
computer program code for comparing each of the plurality of functional units in the neighborhood with a benchmark functional unit to identify high drive cells; and
computer program code for inserting decoupling capacitors adjacent to each high drive cell if a total number of high drive cells in the neighborhood is greater than a threshold.

19. The computer program product of claim 16, further comprising:
computer program code for placing a plurality of functional units in a layout pattern of an integrated circuit; and
computer program code for applying a routing process to the layout pattern.

20. The computer program product of claim 16, further comprising:
computer program code for applying a circuit timing synthesis process to the layout pattern;
computer program code for applying a timing closure process to the layout pattern; and
computer program code for applying a power analysis process to the layout pattern.

* * * * *